United States Patent
Eckhardt et al.

(10) Patent No.: US 10,739,442 B2
(45) Date of Patent: Aug. 11, 2020

(54) PULSING LASER SPOT TRACKING AND DECODING

(71) Applicant: Sensors Unlimited, Inc., Princeton, NJ (US)

(72) Inventors: Andrew Eckhardt, Richboro, PA (US); Satyen Sukhtankar, Bridgewater, NJ (US)

(73) Assignee: Sensors Unlimited, Inc., Princeton, NJ (US)

( * ) Notice: Subject to any disclaimer, the term of this patent is extended or adjusted under 35 U.S.C. 154(b) by 324 days.

(21) Appl. No.: 15/424,504

(22) Filed: Feb. 3, 2017

(65) Prior Publication Data

US 2018/0224531 A1 Aug. 9, 2018

(51) Int. Cl.
| | |
|---|---|
| *G01S 7/48* | (2006.01) |
| *G01S 7/4863* | (2020.01) |
| *G01S 17/10* | (2020.01) |
| *G01J 1/42* | (2006.01) |
| *F41G 7/22* | (2006.01) |

(52) U.S. Cl.
CPC .............. *G01S 7/4863* (2013.01); *G01J 1/42* (2013.01); *G01S 17/10* (2013.01); *F41G 7/2293* (2013.01); *G01J 2001/4238* (2013.01)

(58) Field of Classification Search
CPC .... G01S 7/4863; G01J 1/42; G01J 2001/4238
See application file for complete search history.

(56) References Cited

U.S. PATENT DOCUMENTS

| | | |
|---|---|---|
| 8,107,057 B2 | 1/2012 | Audier et al. |
| 8,451,432 B2 | 5/2013 | Crawford et al. |
| 8,653,427 B2 | 2/2014 | Schmitt et al. |
| 9,127,911 B2 | 9/2015 | Varshneya et al. |
| 2007/0007436 A1 | 1/2007 | Maksymowicz |
| 2012/0248288 A1 | 10/2012 | Linder et al. |
| 2016/0011313 A1 | 1/2016 | Rousseau |
| 2016/0161587 A1 | 6/2016 | Caplan |
| 2018/0209765 A1* | 7/2018 | Titus .................... F41G 7/26 |

FOREIGN PATENT DOCUMENTS

| | | |
|---|---|---|
| CN | 103760567 B | 6/2016 |
| CN | 105874662 A | 8/2016 |
| EP | 2816309 A2 | 12/2014 |
| WO | WO-2011073980 A1 | 6/2011 |

OTHER PUBLICATIONS

Extended European Search Report, of the European Patent Office, dated Jul. 4, 2018 in corresponding European Patent Application No. 18154964.3.

* cited by examiner

*Primary Examiner* — Tony Ko
(74) *Attorney, Agent, or Firm* — Locke Lord LLP; Daniel J. Fiorello; Scott D. Wofsy

(57) ABSTRACT

A non-transitory computer readable medium including computer executable instructions for performing a method that includes locating a pulsing laser on an imaging array, defining a sub-region array smaller than the imaging array based on a location of the located pulsing laser such that the pulsing laser is at least partly within the sub-region, and sampling the sub-region array at a sub-region sampling rate that is higher than a remainder region sampling rate.

20 Claims, 3 Drawing Sheets

PULSING LASER SPOT TRACKING AND DECODING

BACKGROUND

1. Field

The present disclosure relates to laser spot tracking, more specifically to frequency decoding.

2. Description of Related Art

Currently available methods of laser spot tracking and frequency decoding are not suited to low power implementations. Accurate tracking and frequency measurement requires an image sensor which runs at very high speed and, as a result, the electronics require high operating power which limits the run time of handheld, battery powered devices.

Such conventional methods and systems have generally been considered satisfactory for their intended purpose. However, there is still a need in the art for improved laser spot tracking and frequency decoding systems. The present disclosure provides a solution for this need.

SUMMARY

A non-transitory computer readable medium including computer executable instructions for performing a method that includes locating a pulsing laser on an imaging array, defining a sub-region array smaller than the imaging array based on a location of the located pulsing laser such that the pulsing laser is at least partly within the sub-region, and sampling the sub-region array at a sub-region sampling rate that is higher than a remainder region sampling rate. The method can include decoding the pulsing laser.

Locating the pulsing laser can include sampling the imaging array at an imaging array sampling rate. The imaging array sampling rate can be slower than the sub-region sampling rate.

Locating the pulsing laser can include determining which pixels of the imaging array are outputting a pulsing signal of predetermined characteristics. Locating the pulsing laser can include determining an XY coordinate of each pixel outputting the pulsing signal on the imaging array.

Defining the sub-region can include defining an XY coordinate sub-region X'Y' that includes the XY coordinates of at least one pixel outputting the pulsing signal. Defining the sub-region can include defining a coordinate sub-region X'Y' that includes all XY coordinates of each pixel outputting the pulsing signal.

The method can further include tracking the pulsing laser if the pulsing laser moves by redefining the sub-region. Redefining the coordinate sub-region can be done in real time. In certain embodiments, redefining the coordinate sub-region can include comparing a first frame to a second frame to determine an expected location of the pulsing laser on the image array in a subsequent frame. The method can include recycling the method if the pulsing has moved outside of the sub-region a predetermined amount.

The method can include determining an expected time of arrival (TOA) of the pulsing laser on the image array, wherein sampling includes sampling the sub-region during the expected TOA. The method can include detecting a pulse repetition interval (PRI) of the pulsing laser and modifying the sub-region sample rate and/or the remainder sample rate as a function of the PRI. Sampling can include only sampling the sub-region at the sub-region sampling rate for a sample interval based on the PRI. Embodiments of the method can allow for about 22 times finer precision at a same data bandwidth and without consuming additional power.

In accordance with at least one aspect of this disclosure, a laser pulse sensing device can include an imaging array and a sensing module operatively connected to the imaging array to receive signals from the imaging array. The sensing module is configured to perform a method as described above. In certain embodiments, the sensing module can include a pulse sensor read logic module configured to sample the imaging array and/or the sub-region at one or more sampling rates, a pulse detector module configured to locate the pulsing laser on the imaging array, a pulse tracker module configured to track the pulsing laser on the imaging array, and a sub-region control module configured to define and/or move the sub-region based on the location of the laser and/or to define the sub-region sampling rate. Any other suitable components are contemplated herein.

The sub-region control module can include a descriptor queue module for receiving expected time of arrival (TOA) data of the pulsing laser and expected position data of the pulsing laser from the pulse tracker module, a scheduler module connected to the descriptor queue and configured to sort descriptors according to the TOA data and/or the position data to create and/or sample a sub-region in a time period, a time reference module connected to the schedule module to provide the scheduler module with a time reference to compare TOA data to, and a command generator module connected to the scheduler module to cause sampling of the sub-region at the sub-region sampling rate in the time period. Any other suitable components are contemplated herein.

In accordance with at least one aspect of this disclosure, a handheld battery powered electronic device can include a laser pulse sensing device as described above. Any other suitable components are contemplated herein.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
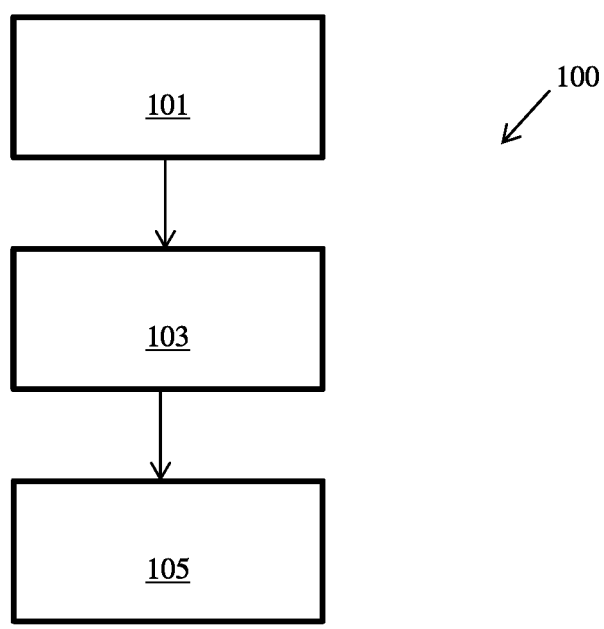
FIG. 1 is a flow diagram of an embodiment of a method in accordance with this disclosure.
Figure 2:
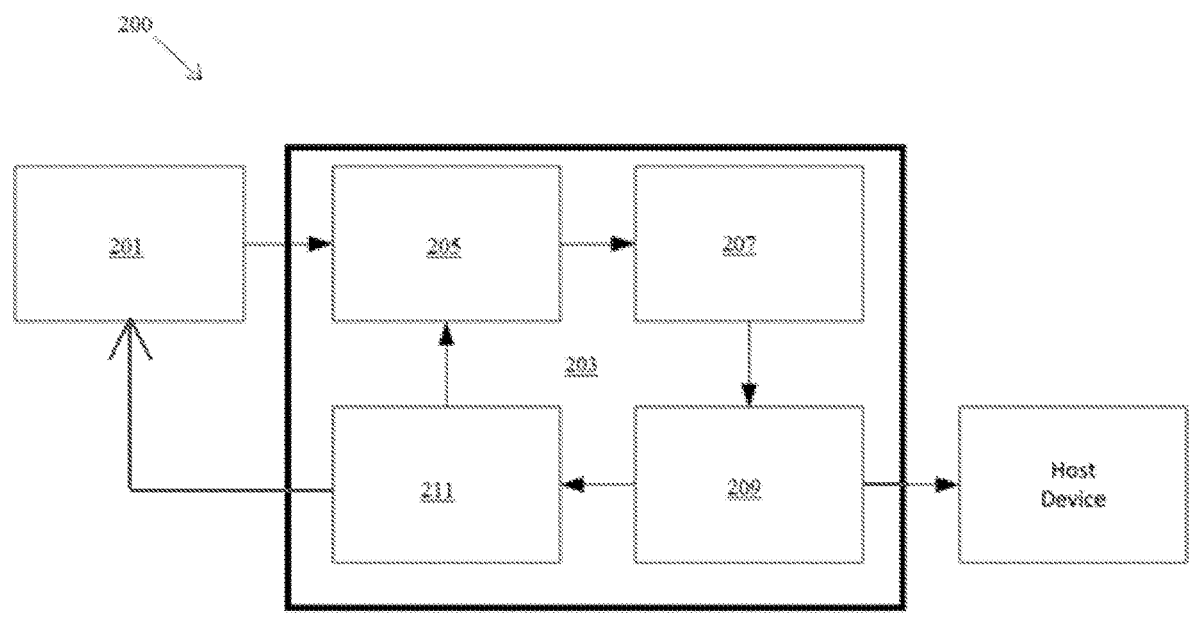
FIG. 2 is a schematic diagram of an embodiment of a laser pulse sensing device in accordance with this disclosure.
Figure 3:
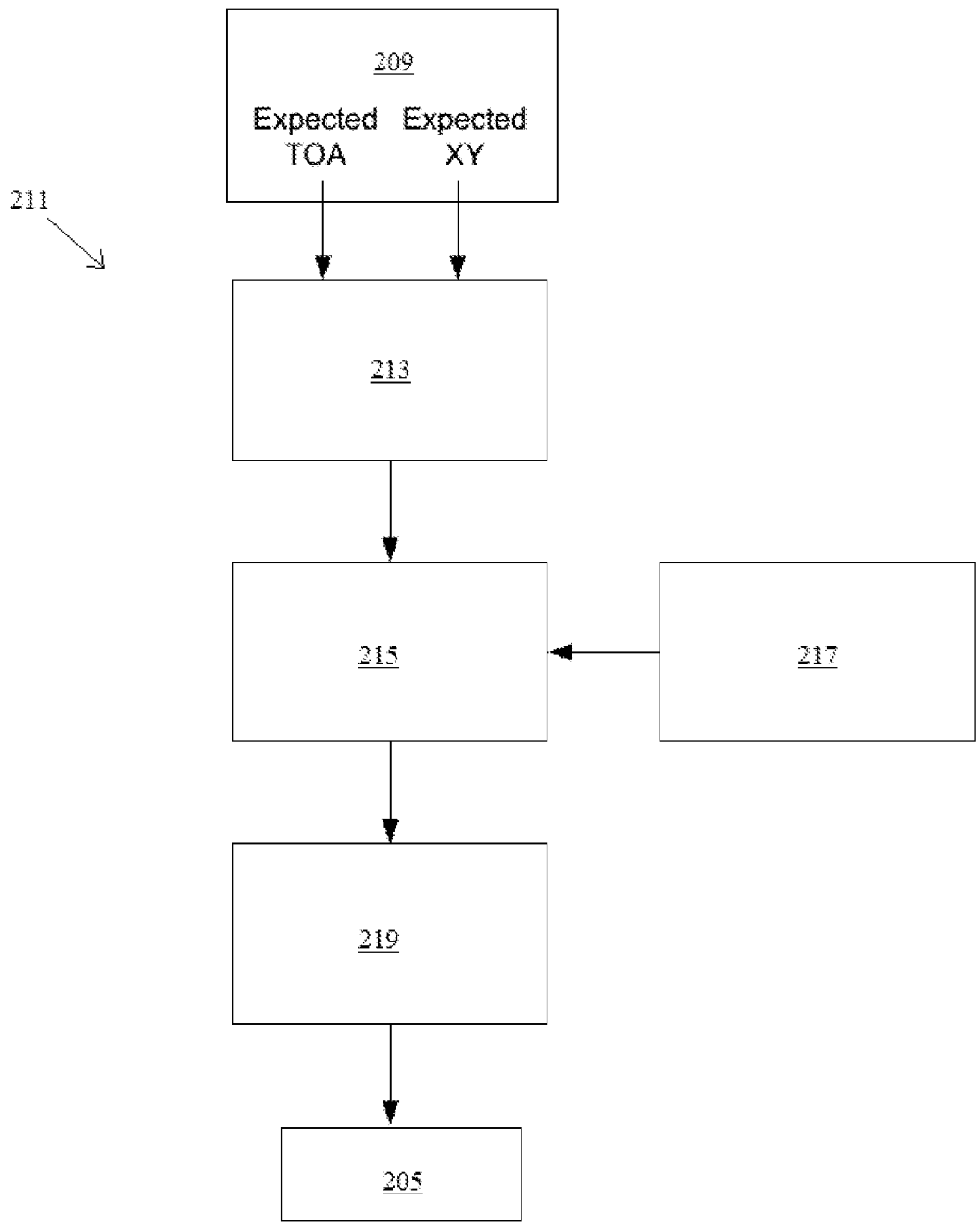
FIG. 3 is a schematic diagram of an embodiment of a sub-region control module in accordance with this disclosure.

Reference will now be made to the drawings wherein like reference numerals identify similar structural features or aspects of the subject disclosure. For purposes of explanation and illustration, and not limitation, an illustrative view of an embodiment of a method in accordance with the disclosure is shown in FIG. 1 and is designated generally by reference character 100. Other embodiments and/or aspects of this disclosure are shown in FIGS. 2 and 3. The systems and methods described herein can be used to reduce energy consumption in detecting and/or decoding pulsed lasers, for example. Any other suitable use is contemplated herein.

Referring to FIG. 1, a method 100 is shown. The method 100 can be embodied in any suitable computer executable instructions (e.g., code) and stored on a non-transitory computer readable medium.

The method 100 can include locating (e.g., at block 101) a pulsing laser on an imaging array. The method 100 also includes defining (e.g., at block 103) a sub-region array smaller than the imaging array based on a location of the located pulsing laser such that the pulsing laser is at least partly within the sub-region. The method 100 can also include sampling (e.g., at block 105) the sub-region array at a sub-region sampling rate that is higher than a remainder region sampling rate. In certain embodiments, the method 100 can include decoding the pulsing laser.

Locating (e.g., at block 101) the pulsing laser can include sampling the imaging array at an imaging array sampling rate. The imaging array sampling rate can be slower than the sub-region sampling rate.

Locating (e.g., at block 101) the pulsing laser can include determining which pixels of the imaging array are outputting a pulsing signal of predetermined characteristics. Locating (e.g., at block 101) the pulsing laser can include determining an XY coordinate of each pixel outputting the pulsing signal on the imaging array.

Defining (e.g., at block 103) the sub-region can include defining an XY coordinate sub-region X'Y' that includes the XY coordinates of at least one pixel outputting the pulsing signal. Defining (e.g., at block 103) the sub-region can include defining a coordinate sub-region X'Y' that includes all XY coordinates of each pixel outputting the pulsing signal.

The method 100 can further include tracking the pulsing laser if the pulsing laser moves by redefining the sub-region. Redefining the coordinate sub-region can be done in real time. In certain embodiments, redefining the coordinate sub-region can include comparing a first frame to a second frame to determine an expected location of the pulsing laser on the image array in a subsequent frame. The method 100 can include recycling the method if the pulsing has moved outside of the sub-region a predetermined amount.

The method 100 can include determining an expected time of arrival (TOA) of the pulsing laser on the image array, wherein sampling includes sampling the sub-region during the expected TOA. The method 100 can include detecting a pulse repetition interval (PRI) of the pulsing laser and modifying the sub-region sample rate and/or the remainder sample rate as a function of the PRI. Sampling (e.g., at block 105) can include only sampling the sub-region at the sub-region sampling rate for a sample interval based on the PRI.

In accordance with at least one aspect of this disclosure, referring to FIG. 2, a laser pulse sensing device 200 can include an imaging array 201 and a sensing module 203 operatively connected to the imaging array 201 to receive signals from the imaging array 201. The sensing module 203 is configured to perform any suitable embodiment of a method 100 and/or any suitable portion thereof as described above.

In certain embodiments, the sensing module 203 can include a pulse sensor read logic module 205 configured to sample the imaging array and/or the sub-region at one or more sampling rates. The pulse sensor read logic can control the operation cycle of the imaging array 201, alternating between exposure of the light receiving elements (pixels) and readout of the sensed laser pulses by rows and columns, either the full array or a sub-region thereof. The pulse sensor read logic can output the read image to the pulse detector module.

The sensing module 203 can also include a pulse detector module 207 configured to locate the pulsing laser on the imaging array. The pulse detector module 207 can analyze the image of the laser beam which has been formed on the light sensing elements of the imaging array 201 and subsequently read out by the pulse sensor read logic 205. Then for each location in the image at which the pulse detector 207 finds a laser beam, the pulse detector can forward the row and column position within the array or sub-region to the pulse tracker module 209.

In certain embodiments, the sensor module 203 can also include a pulse tracker module 209 configured to track the pulsing laser on the imaging array. The pulse tracker module 209 can sort and aggregate the pulsed laser beams reported as described above by and received from the pulse detector module 207 according to their common characteristics. Such characteristics can include position within the image and pulse repetition interval (PRI). The sensor module 203 can include a sub-region control module 211 configured to define and/or move the sub-region based on the location of the laser and/or to define the sub-region sampling rate. The sub-region control module 211 can sort the descriptors and communicates with the pulse sensor read logic module 205. Any other suitable components are contemplated herein.

Referring to FIG. 3, in certain embodiments, the sub-region control module 211 can include a descriptor queue module 213 for receiving expected time of arrival (TOA) data of the pulsing laser and expected position data of the pulsing laser from the pulse tracker module 209, for example. The sub-region control module 211 can also include a scheduler module 215 connected to the descriptor queue and configured to sort descriptors according to the TOA data and/or the position data to create and/or sample a sub-region in a time period. The scheduling modules 215 can perform sorting of descriptors according to the included TOA data so that sub-regions are served in the correct time order.

The sub-region control module 211 can also include a time reference module 217 connected to the schedule module to provide the scheduler module 215 with a time reference to compare TOA data to. After sorting the scheduler module 215 can wait and compare the descriptor TOA with a time reference from the time reference module 217.

The sub-region control module 211 can also include a command generator module 219 connected to the scheduler module 215 to cause sampling of the sub-region at the sub-region sampling rate in the time period. When the time has advanced to just prior to TOA of the descriptor, via control logic the schedule module 215 can signal the command generator module to initiate readout of the sub-region at the position indicted in the expected position (e.g., Expected XY) field of the descriptor.

Any other suitable components for the sub-region control module 211 are contemplated herein. In certain embodiments, the sub-region control module 211 and/or any suitable portion thereof can be either integral with the read login module 205 or separate from the read logic module 205. Any other suitable combination and/or amalgamation of modules is contemplated herein.

Optical energy can be received at the imaging array 201 which can include a planar X*Y pulse sensor array, where X and Y are the number of photodetectors in each row and column of the array, which can be updated at a certain frame rate F. The operating power required to read and decode data from a planar field of detectors is proportional to X*Y*F. Embodiments can selectively read the pulse bitmap to allow high accuracy pulse time of arrival (TOA) measurements while keeping the operating power and data bandwidth at a low level compatible with portable equipment by using sub-regions of the full pulse imaging frame in combination with multiple sampling rates.

Initially the full X*Y plane can be sampled at reduced frame rate to acquire the pulse emitter starting position and a coarse measurement of its pulse repetition interval (PRI). Thereafter a pulse tracker can estimate the TOA and position of received pulses following initial acquisition. Signals whose PRI requires finer TOA resolution require a higher frame rate F' and but can be limited to a smaller X' *Y' sub-region of photo detectors of the full array. X' and Y' can be much smaller than X and Y to keep operating power low.

For example, coarse measurement using X=640 and Y=512 and F=1000 requires data bandwidth X*Y*F=327.68 Mb/s. Similarly, fine measurement using the sub-region X'=122 and Y'=122 and F'=22000 has data bandwidth X'*Y'*F'=327.45 Mb/s. Thus, the combination of higher frame rate F' and sub-window size X' and Y' allows achievement of 22× finer precision at virtually same data bandwidth.

In this case, the pulse tracker 209 can insert descriptors containing the expected time of arrival and position of the next pulse on a scheduling module 215 (which can be part of the sub-region control module 211). The sub-region control module 211 can continually compare current time to the time in the descriptor. When the current time matches the expected time of arrival, the sub-region control module 211 can command the read logic module 205 to read imaging array elements bounded by each sub-regions X'Y' as the laser pulse arrives so that image data is presented to the pulse detector 207 and pulse tracker 209. The system 200 can then immediately revert back to reading full X*Y frame of the imaging array 201 at reduced frame rate, in certain embodiments, after receiving the laser pulse during the TOA.

In accordance with at least one aspect of this disclosure, a handheld battery powered electronic device can include a laser pulse sensing device as described above. Any other suitable components are contemplated herein.

As described above, embodiments include a laser pulse sensor and processing and control logic to detect the presence of optical energy received when coded pulses of laser light are fired from a pulse emitter such as a laser designator or rangefinder, for example. Embodiments can locate and determine coarse rate of a pulsing laser using a lower sampling rate than the laser pulsing rate. The systems can focus in on a sub-region and can further determine a more accurate pulse rate using a higher sampling rate for the sub-region. Embodiments can move the sub-region to follow the laser spot around the entire imaging array grid in the event the laser spot moves. In certain embodiments, if sight is lost, the process can be started again.

Embodiments allow low power electronics to perform precise tracking and frequency decoding of pulsed lasers by reducing the average speed of the image sensor by controlling the sensor in smalltime intervals such that, in certain time intervals, smaller sub-regions of the overall image are sampled a very high speed. The number of high speed time intervals can be a small fraction of the total time intervals. In the remaining intervals the full image can be sampled at a normal much, lower speed.

As appreciated by those skilled in the art, prior technology could not provide both accuracy and low operating power at the same time. One or the other would be compromised. Embodiments provide high accuracy position accuracy, precise frequency decoding, and, at the same time, enable a low operating power implementation.

As will be appreciated by those skilled in the art, aspects of the present disclosure may be embodied as a system, method or computer program product. Accordingly, aspects (e.g., modules as described above) of the this disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

The methods and systems of the present disclosure, as described above and shown in the drawings, provide for imaging systems and methods with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A non-transitory computer readable medium including computer executable instructions for performing a method, the method comprising:
   locating a pulsing laser on an imaging array;
   defining a sub-region array smaller than the imaging array based on a location of the located pulsing laser such that the pulsing laser is at least partly within the sub-region; and
   sampling the sub-region array at a sub-region sampling rate that is higher than a remainder region sampling rate.

2. The non-transitory computer readable medium of claim 1, wherein the locating the pulsing laser includes sampling the imaging array at an imaging array sampling rate.

3. The non-transitory computer readable medium of claim 2, wherein the imaging array sampling rate is slower than the sub-region sampling rate.

4. The non-transitory computer readable medium of claim 1, wherein the locating the pulsing laser includes determining which pixels of the imaging array are outputting a pulsing signal of predetermined characteristics.

5. The non-transitory computer readable medium of claim 4, wherein the locating the pulsing laser includes determining an XY coordinate of each pixel outputting the pulsing signal on the imaging array.

6. The non-transitory computer readable medium of claim 5, wherein the defining the sub-region includes defining an XY coordinate sub-region X'Y' that includes the XY coordinates of at least one pixel outputting the pulsing signal.

7. The non-transitory computer readable of claim 5, wherein the defining the sub-region includes defining a coordinate sub-region X'Y' that includes all XY coordinates of each pixel outputting the pulsing signal.

8. The non-transitory computer readable medium of claim 1, wherein the method further comprises tracking the pulsing laser if the pulsing laser moves by redefining the sub-region.

9. The non-transitory computer readable medium of claim 1, wherein the method allows for about 22 times finer precision at a same data bandwidth and without consuming additional power.

10. The non-transitory computer readable medium of claim 8, wherein the redefining the coordinate sub-region is done in real time.

11. The non-transitory computer readable medium of claim 8, wherein the redefining the coordinate sub-region includes comparing a first frame to a second frame to determine an expected location of the pulsing laser on the image array in a subsequent frame.

12. The non-transitory computer readable medium of claim 1, wherein the method further comprises determining an expected time of arrival (TOA) of the pulsing laser on the image array, wherein the sampling includes sampling the sub-region during the expected TOA.

13. The non-transitory computer readable medium of claim 1, wherein the method further comprises recycling the method if the pulsing has moved outside of the sub-region a predetermined amount.

14. The non-transitory computer readable medium of claim 1, wherein the method further comprises decoding the pulsing laser.

15. The non-transitory computer readable medium of claim 1, wherein the method further comprises detecting a pulse repetition interval (PRI) of the pulsing laser and modifying the sub-region sample rate and/or the remainder region sample rate as a function of the PRI.

16. The non-transitory computer readable medium of claim 14, wherein the sampling includes only sampling the sub-region at the sub-region sampling rate for a sample interval based on the PRI.

17. A laser pulse sensing device, comprising:
   an imaging array; and
   a sensing module operatively connected to the imaging array to receive signals from the imaging array, the sensing module configured to:
   locate a pulsing laser on the imaging array;
   define a sub-region array smaller than the imaging array based on a location of the located pulsing laser such that the pulsing laser is at least partly within the sub-region array; and
   sample the sub-region array at a sub-region sampling rate that is higher than a remainder region sampling rate.

18. The laser pulse sensing device of claim 17, wherein the sensing module comprises:
   a pulse sensor read logic module configured to sample the imaging array and/or the sub-region array at one or more sampling rates;

a pulse detector module configured to locate the pulsing laser on the imaging array;
a pulse tracker module configured to track the pulsing laser on the imaging array; and
a sub-region control module configured to define and/or move the sub-region array based on the location of the laser and/or to define the sub-region sampling rate.

19. The laser pulse sensing device of claim 18, wherein the sub-region control module comprises:
a descriptor queue module for receiving expected time of arrival (TOA) data of the pulsing laser and expected position data of the pulsing laser from the pulse tracker module;
a scheduler module connected to the descriptor queue and configured to sort descriptors according to the TOA data and/or the position data to create and/or sample the sub-region array in a time period;
a time reference module connected to the schedule module to provide the scheduler module with a time reference to compare TOA data to; and
a command generator module connected to the scheduler module to cause sampling of the sub-region array at the sub-region sampling rate in the time period.

20. A handheld battery powered electronic device, comprising:
a laser pulse sensing device, comprising:
an imaging array; and
a sensing module operatively connected to the imaging array to receive signals from the imaging array, the sensing module configured to:
locate a pulsing laser on the imaging array;
define a sub-region array smaller than the imaging array based on a location of the located pulsing laser such that the pulsing laser is at least partly within the sub-region array; and
sample the sub-region array at a sub-region sampling rate that is higher than a remainder region sampling rate.

* * * * *